(12) United States Patent
Waye et al.

(10) Patent No.: US 8,725,750 B1
(45) Date of Patent: May 13, 2014

(54) FRAMEWORK FOR GENERATING PROGRAMS TO PROCESS BEACONS

(71) Applicant: Hulu LLC, Los Angeles, CA (US)

(72) Inventors: Lucas Waye, Cambridge, MA (US);
Kevin Seng, Los Angeles, CA (US);
Viral Bajaria, Santa Monica, CA (US);
Shane Moriah, Los Angeles, CA (US)

(73) Assignee: Hulu, LLC, Santa Monica, CA (US)

( * ) Notice: Subject to any disclaimer, the term of this patent is extended or adjusted under 35 U.S.C. 154(b) by 0 days.

(21) Appl. No.: 13/660,788

(22) Filed: Oct. 25, 2012

(51) Int. Cl.
*G06F 17/30* (2006.01)

(52) U.S. Cl.
USPC ........... 707/756; 707/706; 707/722; 707/736; 707/790; 706/12; 706/14; 706/15

(58) Field of Classification Search
None
See application file for complete search history.

(56) References Cited

U.S. PATENT DOCUMENTS

| | | | |
|---|---|---|---|
| 7,849,003 B2* | 12/2010 | Egnatios et al. | 705/38 |
| 8,255,347 B2* | 8/2012 | Ellingsworth | 706/20 |
| 8,352,388 B2* | 1/2013 | Estes | 706/12 |
| 2006/0112110 A1* | 5/2006 | Maymir-Ducharme et al. | 707/100 |
| 2008/0320023 A1* | 12/2008 | Fong | 707/101 |
| 2009/0177637 A1* | 7/2009 | Hollebeek | 707/3 |
| 2012/0078974 A1* | 3/2012 | Meijer | 707/803 |
| 2012/0174018 A1* | 7/2012 | Ash et al. | 715/772 |
| 2012/0310785 A1* | 12/2012 | Poulin | 705/27.1 |
| 2013/0246319 A1* | 9/2013 | Tamayo et al. | 706/12 |

* cited by examiner

*Primary Examiner* — Hung Le
(74) *Attorney, Agent, or Firm* — Brian N. Young; Fountainhead Law Group P.C.

(57) ABSTRACT

A method receives a specification for processing beacons. The beacons are associated with an event occurring at a client while a user is interacting with a web application and include unstructured data. The method parses the specification to determine an object model including objects determined from the specification where different specifications are parsed into a format of the object model. A generator is determined and each generator is configured to process the format of the object model to generate a different type of target program to process the beacons and multiple generators can process different specifications that are parsed into the format of the object model. The method runs the generator with the object model to generate a target program configured to identify the beacons for the specification, determine unstructured data in the beacons that were specified in the specification, and transform the unstructured data into structured data.

22 Claims, 6 Drawing Sheets

```
composite Video {
    input int video_id;          // 406
    output string video_name;    // 408 mapper for mapreducejob {
        conversionMethod = "convertVideoIdToVideoName"
    }
                                 // 410
}
composite Browser { ... }
composite Count { ... }          // 412 beacon playback_start {
    Video selected_video;
    Browser user_browser;        // 414
    Count count;
} basefact starts_by_video_and_browser from playback_start {
    dimension selected_video.video_name as videoName;
    dimension user_browser.name as browserName;    // 418
    fact sum(count.count) as totalCount;
}
```

FIG. 4

```
composite Video {
    input int video_id;
    output string video_name;

mapper for mapreducejob {
        conversionMethod = "convertVideoIdToVideoName"
    }
}
composite Browser { ... }
composite Count { ... } beacon playback_start {
    Video selected_video;
    Browser user_browser;
    Count count;
} basefact starts_by_video_and_browser from playback_start {
    dimension selected_video.video_name as videoName;
    dimension user_browser.name as browserName;
    fact sum(count.count) as totalCount;
}
```

```
public class Starts {
    public static Map<KeyStarts, ValueStarts> reduceFn(KeyStarts key,  ⎫ 602
Iterator<ValueStarts> values, Reporter reporter) {                     ⎭
        ValueStarts outValue = new ValueStarts();
        outValue.totalCount = 0L;     604
        while (values.hasNext()) {
            ValueStarts inValue = values.next();
            outValue.totalCount += inValue.totalCount;
        }                    606
        Map<KeyStarts, ValueStarts> output = new HashMap<KeyStarts, ValueStarts>();
        output.put(key, outValue);
        return output;
    }

...                           608 addFilter(new EventFilter(".*playback_start.*"));

addSafeKeyAction(new VideoIdToVideoName<String>(), new
BeaconInputAction("video_id"), new OutputAction("videoName"));    610
        addSafeKeyAction(new BrowserName<String>(), new
BeaconInputAction("browser"), new OutputAction("browserName"));   612
        addSafeValueAction(new Identity<Long>(), new StaticInputAction<Long>(1L),
new OutputAction("totalCount")));
                                                              614

FRAMEWORK FOR GENERATING PROGRAMS TO PROCESS BEACONS

BACKGROUND

Companies provide services that users access using client devices. For example, a user may view a video in a media player. The companies often seek to improve their service by analyzing events that occur while the users are using their client devices. For example, while viewing the video, the user performs different actions, such as seeking to different times in the video, stopping the video, hovering over icons, etc. Web requests are generated to document the actions taken at the client devices (also referred to as "beacons"). For example, when a user's browser requests information from a website, a server may aggregate information, such as the IP address of the computer being used; the time the material was viewed; the type of browser that was used, the type of action taken by the user, etc. The beacons are logged and aggregated for the company.

The beacons include information that is in an unstructured format. The unstructured format is not in a pre-defined data model that a company can easily store in a structured database. For example, many analysis applications are keyed to retrieve data in fields in a structured database. The beacons do not include data that can easily be stored in the correct fields. Thus, if a company is going to analyze the information in the beacons, the company needs to transform the unstructured data into structured data. The structured data organizes the data in a format desired by the company where the company can then analyze the structured data.

Programs need to be written to perform the transformation of the unstructured data of the beacons into structured data. However, each type of beacon has different types of information. Thus, for each type of beacon that the company wants to analyze, a programmer needs to write a program to transform the unstructured data for the beacon to the desired type of structured data. Writing the programs to perform these transformations may be a tedious process. Also, having to write code for the programs limits the number of users that can write the programs because most users are not programmers.

SUMMARY

In one embodiment, a method receives a specification for processing beacons. The beacons are associated with an event occurring at a client while a user is interacting with a web application and include unstructured data. The method then parses the specification to determine an object model including objects determined from the specification where different specifications are parsed into a format of the object model. A generator is determined from a set of generators. Each generator is configured to process the format of the object model to generate a different type of target program to process the beacons and multiple generators can process different specifications that are parsed into the format of the object model. The method then runs the generator with the object model to generate a target program configured to identify the beacons for the specification, determine unstructured data in the beacons that were specified in the specification, and transform the unstructured data into structured data as specified in the specification.

In one embodiment, a non-transitory computer-readable storage medium is provided containing instructions, that when executed, control a computer system to be configured for: receiving a specification for processing beacons, the beacons being associated with an event occurring at a client while a user is interacting with a web application and including unstructured data; parsing the specification to determine an object model including objects determined from the specification, wherein different specifications are parsed into a format of the object model; determining a generator from a set of generators, wherein each generator is configured to process the format of the object model to generate a different type of target program to process the beacons and multiple generators can process different specifications that are parsed into the format of the object model; and running the generator with the object model to generate a target program configured to identify the beacons for the specification, determine unstructured data in the beacons that were specified in the specification, and transform the unstructured data into structured data as specified in the specification.

In one embodiment, an apparatus is provided comprising: one or more computer processors; and a computer-readable storage medium comprising instructions, that when executed, control the one or more computer processors to be configured for: receiving a specification for processing beacons, the beacons being associated with an event occurring at a client while a user is interacting with a web application and including unstructured data; parsing the specification to determine an object model including objects determined from the specification, wherein different specifications are parsed into a format of the object model; determining a generator from a set of generators, wherein each generator is configured to process the format of the object model to generate a different type of target program to process the beacons and multiple generators can process different specifications that are parsed into the format of the object model; and running the generator with the object model to generate a target program configured to identify the beacons for the specification, determine unstructured data in the beacons that were specified in the specification, and transform the unstructured data into structured data as specified in the specification.

The following detailed description and accompanying drawings provide a better understanding of the nature and advantages of particular embodiments.

BRIEF DESCRIPTION OF THE DRAWINGS

FIG. 4 shows a specification according to one embodiment.

FIG. 5 shows the relationship of objects within the composite, beacon, and basefact objects.

FIG. 6 shows an example of a target program according to one embodiment.

DETAILED DESCRIPTION

Described herein are techniques for a framework for processing beacons. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
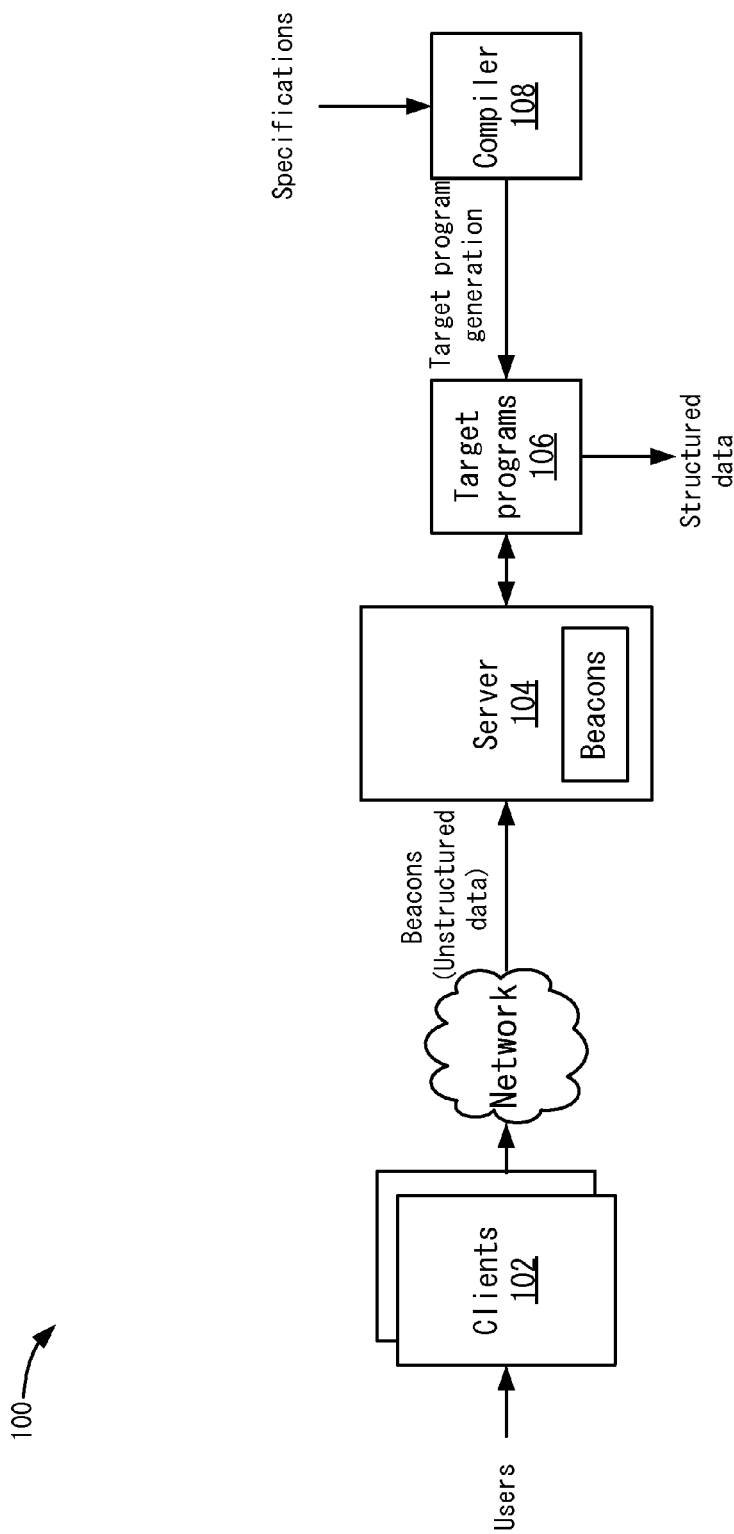
FIG. 1 depicts a simplified system for processing beacons according to one embodiment.

FIG. 1 depicts a simplified system 100 for processing beacons according to one embodiment. System 100 includes clients 102, a server 104, beacon target programs 106, and a beacon target program generation compiler 108. The beacons may include unicode strings and URL encoded binary strings. To obtain any further semantic meaning of the beacon data, the beacon data needs to be interpreted and transformed by target programs. Although beacons are described, which may be web event logs for events that occur while users use clients 102, other types of unstructured data may be appreciated. For example, beacons may also include extensible mark-up language (XML) specifications, hypertext transfer mark-up language (HTML) code, and other human-readable documentation.

Users interact with clients 102 to produce events. For example, users may interact with websites on the worldwide web (WWW), such as through mouse clicks, hovering over objects, and other user interactions with web pages. Beacons are created based on the events and include information for the actions taken by the users and may also include other metadata about the event. For example, the metadata may include user identification information, what platform (e.g., device type or operating system) is being used, what application is being used, etc. The beacons may be unstructured data. Also, different clients 102 and different web sites may generate beacons in different formats.

A server 104 receives and stores the beacons for later processing. In one example, server 104 may aggregate beacons from multiple network devices. Also, server 104 may be a distributed system of servers that are storing the beacons. In this example, server 104 stores the beacons, but other storage devices may store the beacons.

In one example, target programs 106 may be executed to process the beacons. When executed, target programs 106 may determine beacons that are of interest and then transform the unstructured data of the beacons into structured data that can be used by a company. For example, different target programs 106 may be interested in different types of beacons. Each target program 106 would identify the applicable beacons. Then, target programs 106 transform the unstructured data into structured data. The structured data may be stored in a database for later querying, such as to generate reports.

Conventionally, users would have to write target programs 106 for each type of beacon that a company wanted to process. However, particular embodiments automatically generate target programs 106. For example, as will be described in more detail below, compiler 108 receives a specification and uses the specification to automatically generate a target program 106. Using the specification allows users to declaratively specify what beacons are of interest and what structured data is desired. Compiler 108 then generates target programs 106 that can process the beacons and perform the desired transformations from unstructured data to structured data. By using the specification to declare what is wanted, users do not have to write a program that is used to process the beacons. This may allow more users to specify how to process beacons.

Figure 2:
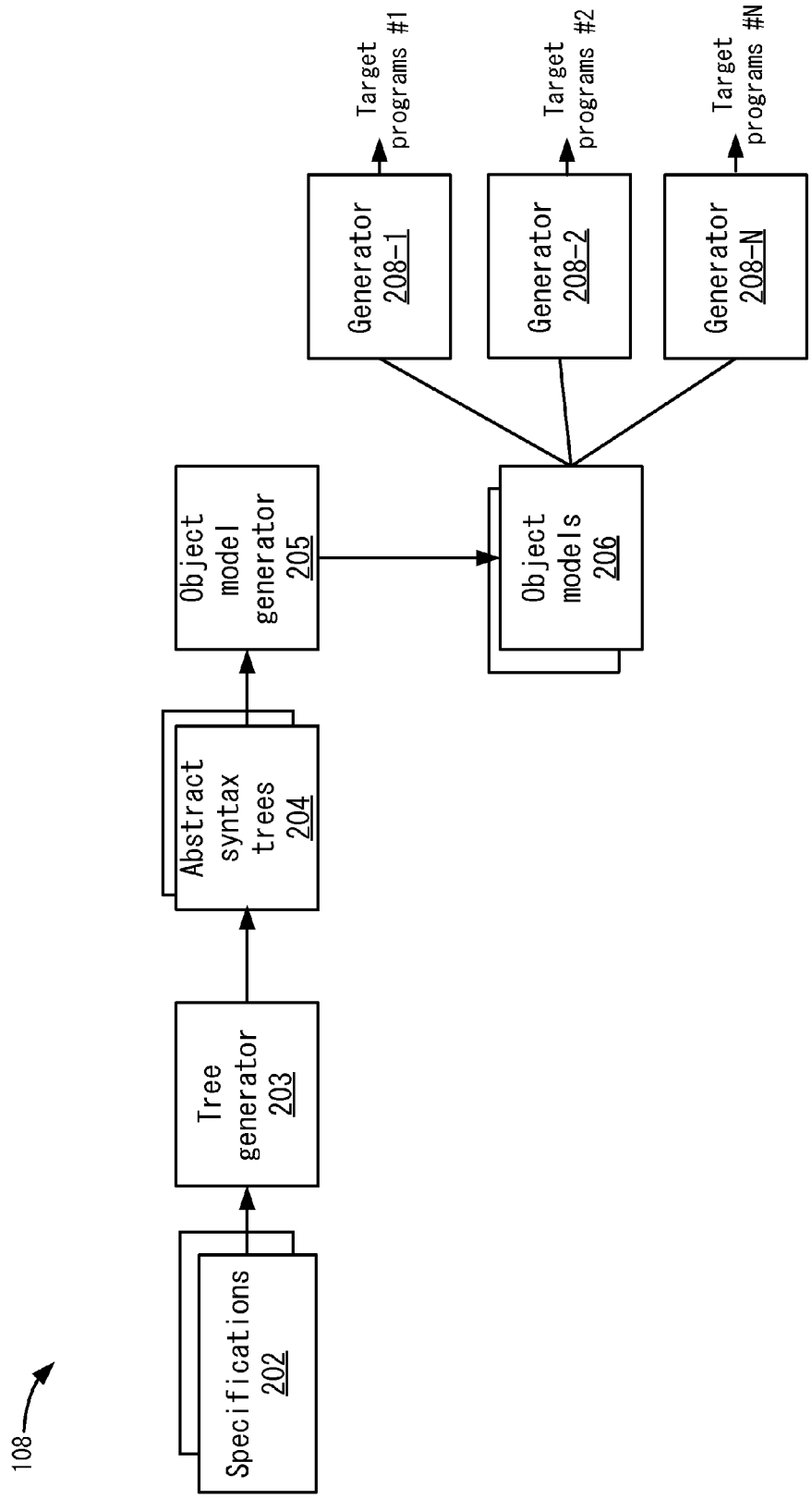
FIG. 2 shows an example of a compiler according to one embodiment.

The process of generating a target program 106 from a specification will now be described in more detail. FIG. 2 shows a more detailed example of compiler 108 according to one embodiment. Specifications 202 may be written using a specific grammar that declares what beacons are of interest and what structured data is desired. Users may write different specifications 202 to generate different structured data from different beacons.

In one embodiment, an abstract syntax tree generator 203 first converts specifications 202 into abstract syntax trees 204. The abstract syntax tree is an abstract way of representing the syntax of different specifications 202. In one embodiment, an abstract syntax tree is a tree representation of the syntactic structure of the input program. The syntax tree is built through the use of a parser, which produces a tree representation of the input program based on a grammar specification.

An object model generator 205 uses the abstract syntax trees to generate object models 206. Object models 206 convert nodes of the abstract syntax tree into objects that are in the object model. The object model is used such that generators 208 can be written to read a specific format defined in the object model. This allows generators 208 to be reused to process different specifications 202. Because beacons may have similar formats of data, specifications 202 may be written and parsed into object models 206. Thus, to process different types of beacons, object models 206 with different objects may be generated, but the same generators 208 may be used. Also, even though the information that is being transformed from unstructured data to structured data may be different, the same generator 208 may be used because each generator 208 is configured to parse the same format of an object model 206. In one embodiment, the object model is a simplified and generalized view of the input specification based on the abstract syntax tree. The object model is generated by passing over the abstract syntax tree multiple times. Specification correctness checks may be performed (semantic analysis), symbols may be resolved (e.g., various references that must be resolved and disambiguated), and a simplified structure is created (called the object model) so that generators 208 can be written more concisely.

Object models 206 are in a format that can be read by different generators 208-1-208-N. Each generator 208-1-208-N may generate target programs #1-N, respectively. For example, some generators 208 may generate MapReduce source code, structured query language (SQL) queries, representational state transfer (REST) requests, HTML documentation, and other target programs. Each generator 208 may be written to process the formats of object models 206 and thus multiple generators 208 do not need to be written for different specifications 202. That is, if MapReduce code is desired, the same MapReduce generator 208 is used for multiple specifications 202. The objects in object model 206 may change, but the same generator 208 may be used.

Figure 3:
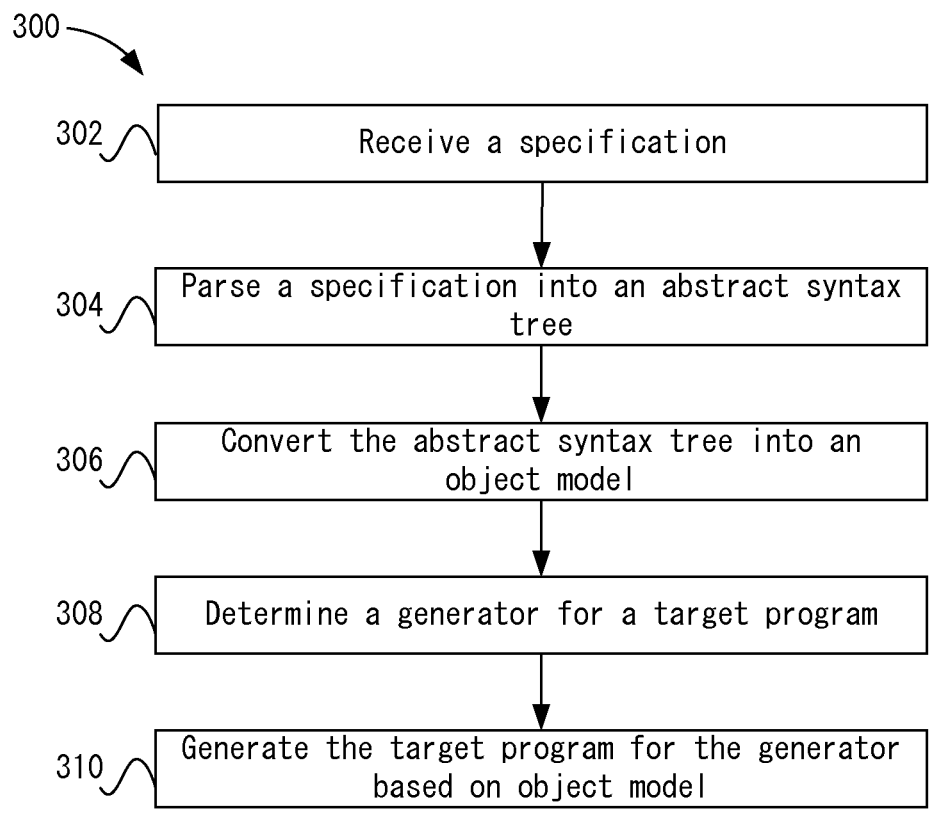
FIG. 3 depicts a simplified flowchart for generating target programs according to one embodiment.

FIG. 3 depicts a simplified flowchart for generating target programs 106 according to one embodiment. At 302, compiler 108 receives a specification 202. Specification 202 specifies which beacons to process and what transformations of the unstructured data to specified structured data are desired. In one embodiment, specification 202 does not include code that is used to process beacons and transform the unstructured data to structured data. Also, compiler 108 may parse the specification for correctness. For example, compiler 108 parse the specification for semantic correctness, such as compiler 108 may determine that a basefact is referencing a beacon that is not defined.

At 304, compiler 108 parses specification 202 into an abstract syntax tree 204. The abstract syntax tree organizes the elements of specification 202 into a tree structure.

At 306, compiler 108 converts abstract syntax tree 204 into an object model 206. For example compiler 108 parses nodes of abstract syntax tree 204 to generate object model 206. Object model 206 organizes specification 202 into objects.

At 308, compiler 108 determines a generator 208 for a target program 106. For example, compiler 108 may receive a user selection of a generator 208. The selected generator 208 is configured to produce a specific type of target program 106.

At 310, compiler 108 generates target program 106 for generator 208 based on object model 206. To illustrate the above process of generating target program 106 from specification 202, an example specification 202 will be described. FIG. 4 shows a specification 202 according to one embodiment. Specification 202 produces a target program 106 to convert a video ID to a video name, transform a browser name for the browser used to play a video to a browser name, and count the number of times the video was played. It should be noted that specification 202 may not be a complete specification and has parts redacted, such as when a " . . . " is shown.

Specification 202 includes three sections of "composite", "beacon", and "basefact". A composite defines what is in the beacon, such as the raw data that is in the beacon, and how to transform the raw data in the beacon. At 402, three composite objects of "Video", "Browser", and "Count" are shown. Composites may have any number of input fields and one or more output fields. At 404, the Video composite object has an input parameter object named "video_id". This is what the beacon parameter name is in a raw log line. For example, the unstructured data may include the term "video_id". At 408, the Video composite object includes an output field object called "video_name". This is the field name after video_id is transformed. At 410, a mapper object for "MapReduceJob" includes transformational logic for the output field object video_name. The mapper object includes details for performing the transformation that is specified in the mapper definition located at conversionMethod. Additional mappers may also be included in a composite object that may perform other transformations. At 412, other composite objects of "Browser" and "Count" are included. Details have not been provided, but would be similar to those found in the Video composite object. It will be understood that specification 202 may include any number of composite objects 402. For example, specification 202 may include additional composite objects (not shown) that may be used by other beacon objects.

At 412, a beacon object is identified as "playback_start" and uniquely identifies the beacon within specification 202. Because specification 202 may include multiple composite objects, the beacon object identifies which composite objects are part of this beacon object. At 414, the beacon includes three field objects: "selected_video", which references the Video composite object; "user_browser", which references the Browser composite object; and "count", which references the Count composite object. The field objects are used to refer back to composite objects.

At 416, specification 202 defines a basefact object of "start_by_video_and_browser". The basefact object is used to define what structured data is desired and what unstructured data should be used to populate the structured data. The basefact object may use multiple basefacts objects. For example, this basefact object uses the "playback_start" beacon object to determine applicable data. That is, this basefact ignores all other beacon objects that are not named "playback_start" in specification 202. At 418, the basefact object includes three structured data field objects for the "playback_start" beacon. The structured data fields may be different types, such as dimension or fact fields. A dimension maps a field in the beacon to a structured data field. A fact may perform a function (e.g., an aggregation function) on a field in the beacon to determine a result that is mapped to a structured data field.

A first structured data field of "videoName" is defined as a dimension of the video_name field object in the composite object referenced by the selected_video field object in the beacon object and a second structured data field of "browserName" is defined as a dimension from the name field object in the composite object referenced by the user_browser field object in the beacon object. A third structured data field of "totalCount" is defined as a fact that is the aggregation of the count field object in the composite object referenced by the count field object in the beacon object.

Once receiving specification 202, compiler 108 selects a generator 208 that is used to generate a target program 106. As discussed above, compiler 108 converts specification 202 into object model 206. Generator 208 takes object model 206 and generates code in a software language that is used to process beacons. In one embodiment, compiler 108 generates MapReduce job code as a target program 106. Target program 106 is configured to receive unstructured data, such as raw web event log lines, and generate structured data specified by the starts_by_video_and_browser basefact definition. That is, transformed data from the beacons is stored in structured data fields of videoName, browserName, and totalCount.

FIG. 5 shows the relationship of objects within the composite, beacon, and basefact objects that generator 208 analyzes to generate code for target program 106. At 502, generator 208 identifies the beacon object for the basefact object. For example, specification 202 may include multiple beacon objects and the beacon object for this basefact object is the playback_start beacon object. Generator 208 generates filtering code that determines which beacons should be processed by target program 106.

The structured data field objects in the basefact object point to field objects in the beacon object at 504. For example, selected_video, user_browser, and count are referenced in both the basefact and the beacon objects. To determine which composite objects these structured data field objects are associated with, at 506, the field objects in the beacon object are associated with composite objects.

Generator 208 then uses the referenced composite objects from the beacon object to generate instructions on how to map unstructured data to structured data. For example, generator 208 generates instructions on how to tokenize (breaking the text of the beacon into words or phrases) and transform raw web log data to structured data. For example, at 508, the basefact object defines the structured data by the terms videoName, browserName, and totalCount, which are structured data fields that can be defined in a database. The transformations for the field objects in the basefact object are specified in the composite object that each beacon field object references as was discussed with respect to 506. Also, for the fact field object, generator 208 generates instructions to aggregate rows based on the count composite object.

Generator 208 then outputs the final software code that is compiled into target program 106. Target program 106 can then be used to process beacons and produce the transformed data as specified in the basefact definition.

FIG. 6 shows an example of target program 106 according to one embodiment. Generator 208 may generate target program 106 based on specification 202 and object model 206. At 602, the function "Map" defines the aggregator/reducer based on the MapReduce paradigm. Dimensions correspond to Keys, and Facts correspond to Values. At 604, the field "totalCount" corresponds to the structured data field defined in the basefact object of specification 202. Also, at 606, the "+=" symbol is determined based on the "sum" function in specification 202 that is an aggregator.

At 608, the term "playback_start" is based on which beacons were defined by specification 202. In this case, only events defined by playback_start beacons are reviewed. At 610, the conversion found in the composite Video is found, and at 612, the conversion found in the composite Browser is found. Further, at 614, the functions "Identity<Long>( )" and "StaticInputAction<Long>(1L)" are determined based on the fact "sum" in the basefact in specification 202. The above information is determined by reviewing object model 206 to generate the target program 106.

Accordingly, compiler 108 generates target program 106, which can map unstructured data to structured data. A user can declare the structured data that was desired and the transformations needed to transform unstructured data to structured data. Compiler 108 then generates the software code to perform the desired transformations. A user thus does not need to write software code for target program 106.

Further, particular embodiments leverage object model 206 that allows different generators 208 to operate on the object model. Thus, different specifications 202 may be parsed into an object model 206 that can be operated on by the same generators 208.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving a specification for processing beacons, the beacons being associated with an event occurring at a client while a user is interacting with a web application and including unstructured data;
   parsing, by a computer system, the specification to determine an object model including objects determined from the specification, wherein different specifications are parsed into a format of the object model;
   determining, by the computer system, a generator from a set of generators, wherein each generator is configured to process the format of the object model to generate a different type of target program to process the beacons and multiple generators can process different specifications that are parsed into the format of the object model; and
   running, by the computer system, the generator with the object model to generate a target program configured to identify the beacons for the specification, determine unstructured data in the beacons that were specified in the specification, and transform the unstructured data into structured data as specified in the specification.

2. The method of claim 1, wherein parsing the specification comprises determining a set of composite objects specifying a set of input parameters in the beacon and transformations to transform the set of input parameters to a set of output fields, a beacon object including a set of field objects that identify composite objects for the beacon object, and a basefact object including a set of structured data objects that identify the set of output fields in the composite object to map to a set of structured data fields.

3. The method of claim 2, wherein running the generator comprises determining first information for the beacon object referenced in the basefact object to determine which beacon objects are applicable for the basefact object.

4. The method of claim 3, wherein running the generator comprises determining second information for the set of structured data fields referenced in the basefact object to determine which output fields map to which structured data fields.

5. The method of claim 4, wherein running the generator comprises determining third information for a set of transformations for the set of input parameters in the set of composite objects to determine how to perform transformations to transform the set of input parameters to the set of output fields.

6. The method of claim 5, wherein running the generator comprises generating instructions for the target program using the first information, the second information, and the third information to transform the set of input fields to the set of output fields and map the set of output fields to the set of structured data fields.

7. The method of claim 6, wherein the first information, the second information, and the third information comprise software code.

8. The method of claim 1, further comprising parsing the specification to determine an abstract syntax tree, wherein the object model is determined from the abstract syntax tree.

9. A non-transitory computer-readable storage medium containing instructions, that when executed, control a computer system to be configured for:
   receiving a specification for processing beacons, the beacons being associated with an event occurring at a client while a user is interacting with a web application and including unstructured data;
   parsing the specification to determine an object model including objects determined from the specification, wherein different specifications are parsed into a format of the object model;
   determining a generator from a set of generators, wherein each generator is configured to process the format of the object model to generate a different type of target program to process the beacons and multiple generators can process different specifications that are parsed into the format of the object model; and
   running the generator with the object model to generate a target program configured to identify the beacons for the specification, determine unstructured data in the beacons that were specified in the specification, and transform the unstructured data into structured data as specified in the specification.

10. The non-transitory computer-readable storage medium of claim 9, wherein parsing the specification comprises determining a set of composite objects specifying a set of input parameters in the beacon and transformations to transform the set of input parameters to a set of output fields, a beacon object including a set of field objects that identify composite objects for the beacon object, and a basefact object including a set of structured data objects that identify the set of output fields in the composite object to map to a set of structured data fields.

11. The non-transitory computer-readable storage medium of claim 10, wherein running the generator comprises determining first information for the beacon object referenced in the basefact object to determine which beacon objects are applicable for the basefact object.

12. The non-transitory computer-readable storage medium of claim 11, wherein running the generator comprises determining second information for the set of structured data fields referenced in the basefact object to determine which output fields map to which structured data fields.

13. The non-transitory computer-readable storage medium of claim 12, wherein running the generator comprises determining third information for a set of transformations for the set of input parameters in the set of composite objects to determine how to perform transformations to transform the set of input parameters to the set of output fields.

14. The non-transitory computer-readable storage medium of claim 13, wherein running the generator comprises generating instructions for the target program using the first information, the second information, and the third information to transform the set of input fields to the set of output fields and map the set of output fields to the set of structured data fields.

15. The non-transitory computer-readable storage medium of claim 14, wherein the first information, the second information, and the third information comprise software code.

16. The non-transitory computer-readable storage medium of claim 9, further comprising parsing the specification to determine an abstract syntax tree, wherein the object model is determined from the abstract syntax tree.

17. An apparatus comprising:
one or more computer processors; and
a computer-readable storage medium comprising instructions, that when executed, control the one or more computer processors to be configured for:
receiving a specification for processing beacons, the beacons being associated with an event occurring at a client while a user is interacting with a web application and including unstructured data;
parsing the specification to determine an object model including objects determined from the specification, wherein different specifications are parsed into a format of the object model;
determining a generator from a set of generators, wherein each generator is configured to process the format of the object model to generate a different type of target program to process the beacons and multiple generators can process different specifications that are parsed into the format of the object model; and
running the generator with the object model to generate a target program configured to identify the beacons for the specification, determine unstructured data in the beacons that were specified in the specification, and transform the unstructured data into structured data as specified in the specification.

18. The apparatus of claim 17, wherein parsing the specification comprises determining a set of composite objects specifying a set of input parameters in the beacon and transformations to transform the set of input parameters to a set of output fields, a beacon object including a set of field objects that identify composite objects for the beacon object, and a basefact object including a set of structured data objects that identify the set of output fields in the composite object to map to a set of structured data fields.

19. The apparatus of claim 18, wherein running the generator comprises determining first information for the beacon object referenced in the basefact object to determine which beacon objects are applicable for the basefact object.

20. The apparatus of claim 19, wherein running the generator comprises determining third information for a set of transformations for the set of input parameters in the set of composite objects to determine how to perform transformations to transform the set of input parameters to the set of output fields.

21. The apparatus of claim 20, wherein running the generator comprises generating instructions for the target program using the first information, the second information, and the third information to transform the set of input fields to the set of output fields and map the set of output fields to the set of structured data fields.

22. The apparatus of claim 21, wherein the first information, the second information, and the third information comprise software code.

* * * * *